United States Patent [19]

Preston

[11] Patent Number: 4,821,766
[45] Date of Patent: Apr. 18, 1989

[54] TOILET TANK FILL VALVE

[76] Inventor: Norman R. Preston, 14 Linton Place, Kitchener, Ontario, Canada, N2B 2J9

[21] Appl. No.: 166,831

[22] Filed: Mar. 4, 1988

Related U.S. Application Data

[63] Continuation of Ser. No. 910,467, Sep. 3, 1986, abandoned.

[51] Int. Cl.$^4$ .............................................. F16K 31/18
[52] U.S. Cl. ..................................... 137/421; 137/403; 137/426
[58] Field of Search ............... 137/403, 421, 426, 429, 137/549

[56] References Cited

U.S. PATENT DOCUMENTS

| | | | |
|---|---|---|---|
| 667,417 | 2/1901 | Wright | 137/429 X |
| 2,369,870 | 2/1945 | Thiel | 137/421 X |
| 2,400,561 | 5/1946 | Harris | 137/421 X |
| 2,827,915 | 3/1958 | Mitchell | 137/421 |
| 2,841,169 | 7/1958 | Martin et al. | 137/421 X |
| 3,104,677 | 9/1903 | Fleckenstein et al. | 137/449 X |
| 3,581,752 | 6/1971 | Schoepe et al. | 137/549 X |

FOREIGN PATENT DOCUMENTS 542693  4/1922  France ................. 137/421
609101  8/1926  France ................. 137/549

Primary Examiner—A. Michael Chambers
Assistant Examiner—John C. Fox
Attorney, Agent, or Firm—Craig Armstrong

[57] ABSTRACT

A toilet tank fill valve assembly is disclosed, in which the tank water level at which the valve opens is different from the tank water level at which the valve closes. The valve has a substantially vertical rod, which moves up to activate a lever to allow the ballcock valve to close, and moves down to activate the lever to open the ballcock valve. The rod has upper and lower stops, preferably adjustable, corresponding to the valve closing and valve opening positions respectively. A float lifts the upper stop when the tank becomes full, thereby allowing the ballcock valve to close. A weight pushes the lower stop down when the tank becomes empty, thereby opening the ballcock valve. The float and weight may be separate units, or may be a single unit which rides up and down on the rod between the stops. Embodiments are described in which the valve is positioned either above or below the tank-full water line, a ball-seat check valve being provided in the latter case to prevent the backflow of water from the tank into the main water supply if the main supply is disconnected. A polyethylene filter is provided on the inlet side of the valve.

8 Claims, 3 Drawing Sheets

TOILET TANK FILL VALVE

BACKGROUND OF THE INVENTION

This invention relates generally to toilet tank fill valves.

The valve most commonly used in toilet tanks is a ballcock valve which is responsive to the level of water in the tank. When the toilet is flushed, the level of the water in the tank drops, causing a float to drop with the water level. As the float begins to drop, its weight causes the ballcock valve to open, allowing water to flow into the toilet tank from the main water supply. This type of system consequently allows water to flow into the toilet tank before the tank has been fully drained, thereby wasting a certain amount of water.

The conventional type of valve also has a number of parts which are prone to gradual deterioration, e.g. washers, O-rings, steel hinge pins, etc.. Such deterioration may cause water to leak from the main water supply into the tank from time to time. A further problem is that sand and dirt which are in the main water supply may become lodged in the valve seat, allowing water to escape from the main supply into the tank. This type of valve is also generally unable to prevent at least some backflow of tank water into the main water supply if the main supply is shut off.

Furthermore, many conventional valves generally do not readily allow for adjustment of the water level at which the inlet is closed, i.e. they do not readily allow for adjustment of the tank-full water level, and thus the volume of water to be used for the flush. In practice, when one wants to vary the water level in a tank using a conventional valve, one frequently just bends the lever arm which carries the float, to set the float to a different height for a given valve position, although in some cases the float arm may be threaded so that the float can be screwed up or down the arm.

One valve which does not allow for fairly simple adjustment of the tank-full water level is the valve described in U.S. Pat. Nos. 3,319,913, 3,429,333, and 3,495,803, in which the position of a float on a rod attached to the lever which actuates the ballcock valve can be changed. However, the valve described in these patents does not deal at all with the problem of the inlet valve opening before the tank is substantially emptied.

SUMMARY OF THE INVENTION

It is an object of the present invention to provide a toilet tank fill valve in which the tank water level at which the valve opens is different from the tank water level at which the valve closes.

It is a feature of the preferred embodiment of the invention that the tank water levels at which the valve opens and closes may be adjusted, which allows the user to vary the water level in the tank at which the valve opens for refilling after flusing, and to vary the amount of water held in the tank when it is full, i.e. the "tank-full" water level.

It is a further feature of the preferred embodiment of the invention that the valve prevents backflow of the tank water into the main water supply when the main supply is shut off.

Another feature of the preferred embodiment is that a polyethylene filter is provided on the inlet side of the valve, to prevent soil and dirt from reaching and lodging in the valve seat to cause an imperfect seal of the valve.

The valve comprises a substantially vertical rod, which moves up to activate a lever to allow the ballcock valve to close, and moves down to activate the lever to open the ballcock valve. The rod has upper and lower stops corresponding to the valve closing and valve opening positions respectively. A float lifts the upper stop when the tank becomes full, thereby allowing the ballcock valve to close. A weight pushes the lower stop down when the tank becomes empty, thereby opening the ballcock valve.

In the preferred embodiment of the invention, the float is connected to the upper stop, and may be formed, for example, as a downwardly-opening cup, the air trapped in the cup by the rising water causing it to act as a float. The weight is connected to the lower stop, and may be formed, for example, as an upwardly-opening cup, the weight of the water carried in the cup causing it to act as a weight as the surrounding water drops away.

In an alternative embodiment, the float and the weight are one and the same, the float/weight riding up and down the rod to act as a float against the upper stop, and to act as a weight against the lower stop.

Preferably, the stop positions are adjustable on the rod, so that both the water level at which the valve opens and the water level at which the valve closes can be adjusted.

Embodiments are described in which the valve is positioned either above or below the tank-full water line. In the case of embodiments where the valve is below the tank-full water line, a ball-seat check valve is provided to prevent the backflow of water from the tank into the main water supply if the main supply is disconnected.

BRIEF DESCRIPTION OF THE DRAWINGS

The preferred and alternative embodiments will now be described in detail with reference to the accompanying drawings, in which.

DETAILED DESCRIPTION OF THE PREFERRED EMBODIMENT

Figure 1:
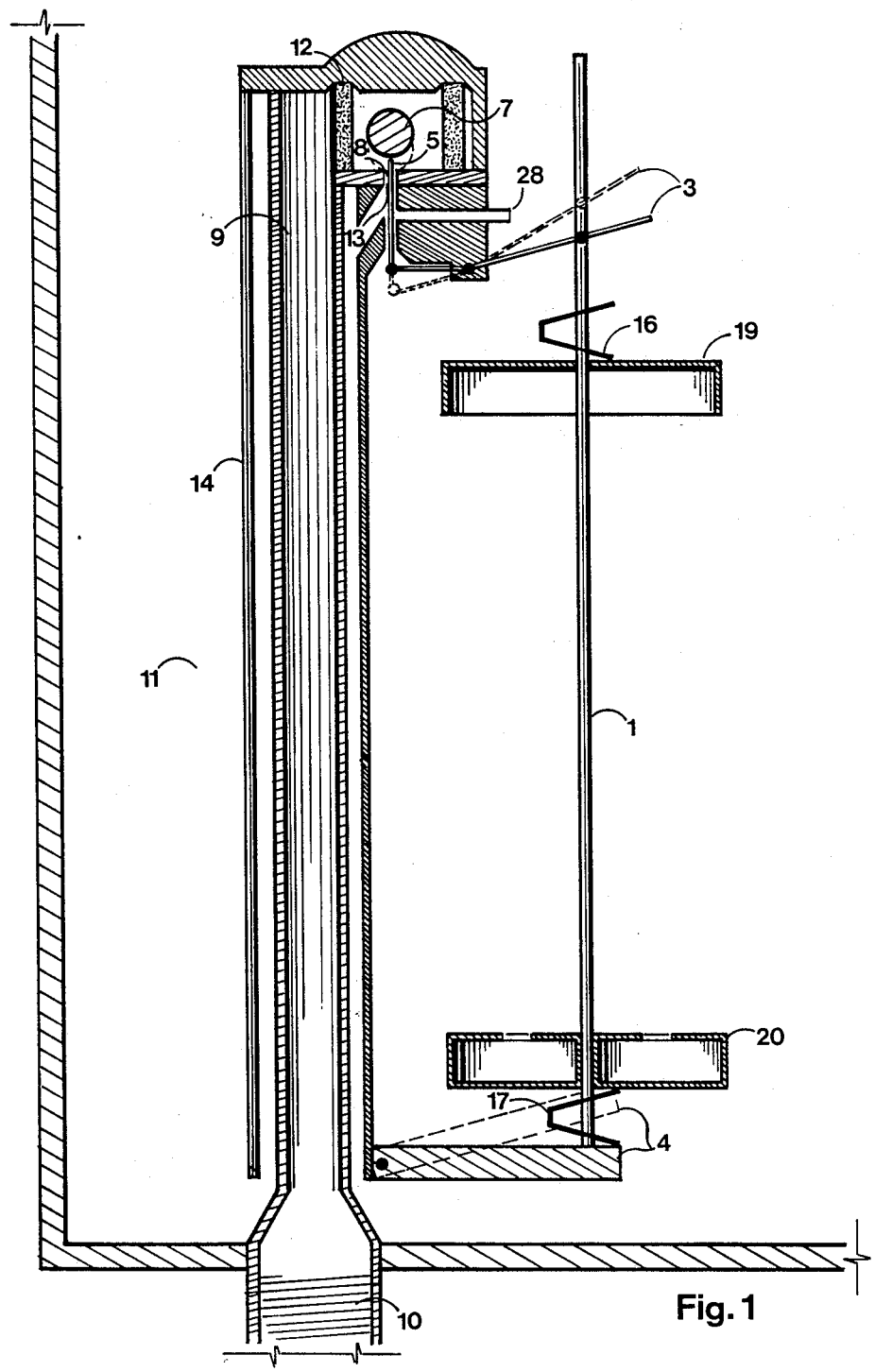
FIG. 1 is a cross-section through the preferred embodiment of the toilet tank fill valve, in which the valve itself is located above the full-tank water level and in which there are separate float and weight elements.

Referring first to FIG. 1, the preferred embodiment of the invention will now be described in detail.

The valve comprises a substantially vertical rod 1, which moves up to activate a lever 3 to close a ballcock valve, and moves down to activate the lever 3 to open the ballcock valve. The rod 1 is loosely attached near one end to the lever 3, and near its other end is loosely attached to pivotable support bracket 4, which serves simply to hold the rod loosely in its substantially vertical position.

When the rod 1 moves down, the lever 3 pivots to cause a plunger 5 to move up, pushing a ball 7 off its seat 8 to allow water to flow in from inlet tube 9. Inlet tube 9 connects to the main supply line 10 at the bottom of the tank 11 and extends up to above the tank-full water line. The ball 7 and seat 8 are located above the tank-full water line. A filter 12 surrounds the ball 7 and seat 8, acting as a ball cage and filtering out any dirt particles which could interfere with the seal between the ball 7 and seat 8. The filter 12 may be formed, for example, from polyethylene foam.

When the plunger 5 forces the ball 7 off its seat 8, water flows through the seat opening 13 and into the tank 11 via tube 14 concentric with inlet tube 9, to carry the water to the bottom of the tank 11, so that the tank 11 fills from the bottom. The ball 7 is free-floating, rather than being attached to the plunger 5. The plunger 5 acts to force the ball 5 away from the seat 8 when the valve is to be open, but is not required to seat the ball 7, since the water pressure in the inlet tube 9 from main supply line 10 acts to force the ball 7 onto the seat 8. The ball 7 is preferably of a resilient, compressible nature, to provide a proper seal, though alternatively the seat 8 may be of a resilient nature.

The rod 1 has upper and lower stops 16 and 17 respectively corresponding to the valve closing and valve opening positions respectively. A float 19 lifts the upper stop 16 when the tank becomes full, thereby closing the ballcock valve. A weight 20 pushes the lower stop 17 down when the tank becomes empty, thereby opening the ballcock valve.

The float 19 is connected to the upper stop 16, and may be formed, for example, as a downwardly-opening cup, the air trapped in the cup by the rising water causing it to act as a float. The weight 20 is connected to the lower stop 17, and may be formed, for example, as an upwardly-opening cup, the weight of the water carried in the cup causing it to act as a weight as the surrounding water drops away. In prototypes of the invention, it has been found that merely 1½ ounces of water in the cup provides enough weight to lift the ball 7 off its seat 8, though in practice it may be desireable to use a somewhat larger volume allow for a margin.

When the toilet is flushed and the toilet tank 11 starts to empty, the valve remains closed because of the supply line pressure acting on the ball 7 to keep the valve closed. As the water level drops below the weight 20, the weight 20 (e.g. the weight of the water in the cup) forces the lower stop 17 and thus the rod 1 to move downwardly. This causes the lever 3 to force plunger 5 upwardly, driving the ball 7 off its seat 8 and allowing water from the main supply line 10 to flow via the inlet tube 9 past the valve and into the tank 11.

A refill tube attachment 28 is located on the valve housing to receive water from the valve when it is open, so that a refill tube can be attached to the housing and routed in conventional fashion so that the toilet bowl refills as the tank is refilled.

Figure 2:
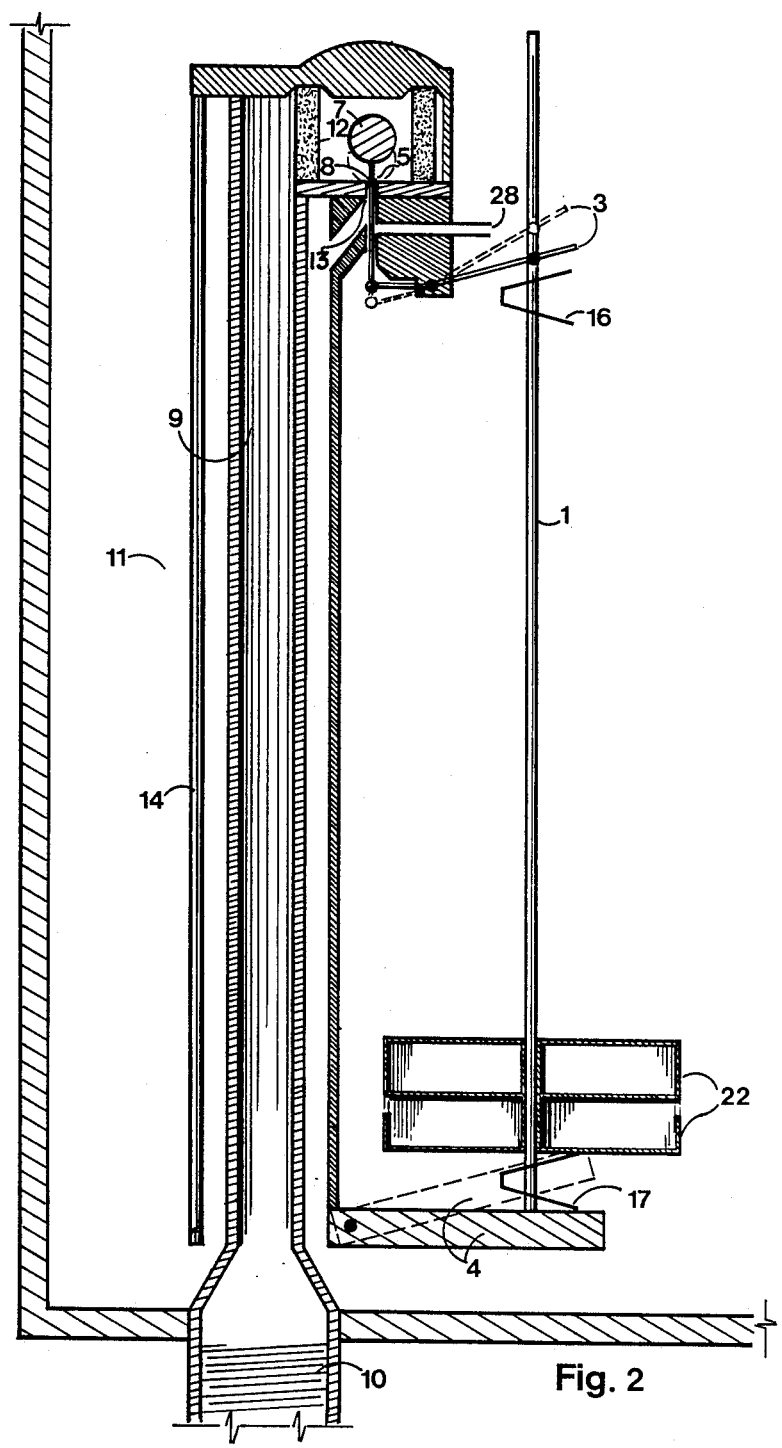
FIG. 2 is a cross-section through a variation on the preferred embodiment, in which the float and weight elements are one end of the same, in the form of a float/weight which rides up and down on a rod.

Referring now to FIG. 2, an alternative embodiment will be described. In the alternative embodiment, the float and the weight are one and the same, in the form of float/weight 22. When the toilet is flushed, and the water level in the tank 11 starts to drop, the float/weight 22 moves downwards until it comes into contact with the lower stop 17. As the water level continues to drop the weight of the float/weight 22 forces the lower stop 17 to moves downwardly.

When water flows into the toilet tank 1, the float/weight 22 rises. The float/weight 22 comes into contact with the upper stop 16, forcing it to rise. The movement of the stop 16 causes the rod 1 to move upwardly.

In all embodiments, the upper and lower stops 16 and 17 respectively are preferably of a design which permits their position on the rod 1 to be readily varied, though once set in position, they must of course remain securely attached. The stops illustrated in the drawings are in the form of adjustable clamps, for example, which can be moved to any position on the rod 1. If the lower clamp 17 is moved to a lower position on the rod 1, the valve will open when the toilet tank 11 is more completely drained. If the lower clamp 17 is moved to a higher position on the rod 1, water will begin to flow into the tank 11 sooner. The valve must be set to open before the tank is fully emptied, of course, or the tank will not refill.

In the same manner, if the upper clamp 16 is removed lower down on the adjusting rod 1, the water supply will be cut off before the tank is filled to its normal position. It is consequently possible to adjust both the amount of water that is in the toilet tank 11 when it is full, and to adjust the level at which the valve opens as the tank is draining. This may result in considerable saving of water.

Figure 3:
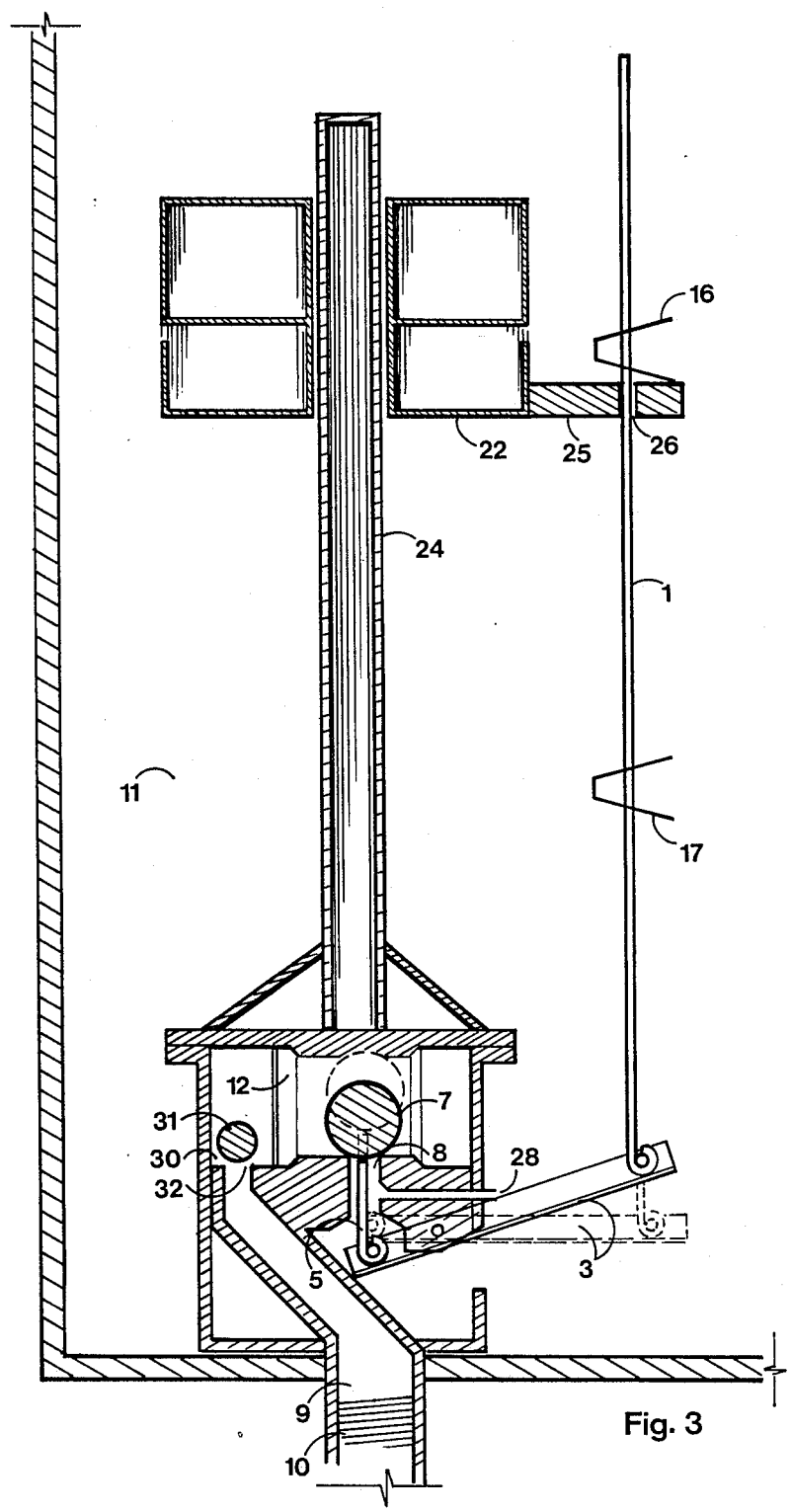
FIG. 3 is a cross-section of an alternative embodiment in which the valve is located below the full-tank water level, including a check valve to prevent draining of the tank when the water supply is shut off.

Referring now to FIG. 3, another alternative embodiment will be described.

In the preferred and alternative embodiments illustrated in FIGS. 1 and 2, it is a feature that the valve is located above the tank-full water line and thus no mechanism is needed to prevent backflow of water from the tank 11 into the main supply line 10 when the water pressure is removed. However, in the FIG. 3 embodiment, the valve is below the water line.

If the main water supply is shut off, to prevent the water in the toilet tank from flowing back into the water supply line 10, a check valve 30, comprising a ball 31 and seat 32, is provided between the inlet tube 9 and the valve ball 7 and seat 8. In a steady-state valve-closed position, the housing area between the check valve 30 on the one hand, and the valve ball 7 and 8 on the other hand, is at the pressure of the main supply line 10. When pressure is removed from the main supply line 10, the resulting greater pressure in this housing area immediately causes the check valve 30 to close, thus preventing any draining of the tank back through the valve. Should the check valve 30 not close quickly enough to sustain line pressure in the housing area, the weight of the water in the tank itself still act to force the ball 31 onto its seat 32, thus preventing any draining of the tank.

In the embodiment shown in FIG. 3, a float/weight 22 rides up and down on a shaft 24. A flange 25, having an aperture 26, rides up and down on the rod 1 between the upper and lower stops 16 and 17.

Alternatively, a separate float and weight could be used, as in the preferred embodiment, in which case a bracket would be required to support the rod 1 in its substantially vertical position.

It should be appreciated that the above description is by way of example only, and that many obvious variations are within the scope of the invention. For example, it is not essential that the valve be of the ball-seat type, although that is advantageous. The invention lies more in the means to trigger opening and closing of the valve than in the valve itself. Similarly, the check valve 30 need not be of the ball-seat type.

What is claimed as the invention is:

1. A toilet tank fill valve for controlling the flow of water from a pressurized inlet line into the tank, comprising:
   a cage connected to said inlet line and having an opening leading to said tank, a free-floating ball contained within said cage and adapted to seat in said opening to block the flow of water from said inlet line to said tank;
   a substantially vertical rod;
   a lever connected to said rod;
   a plunger activated by said lever to unseat said ball in response to downward movement of said rod, and to retract from said opening in response to upward movement of said rod; and
   float/weight means acting on adjustable upper and lower stops positioned on said rod at positions corresponding to upper and lower water levels respectively in said tank to move said rod upwardly and downwardly respectively to close and open said valve respectively; and wherein said cage is connected to said inlet line by virtue of at least a portion of said cage being of a porous filter material and by virtue of said inlet line having a line-pressurized chamber around said porous filter material portion.

2. A toilet tank fill valve as recited in claim 1, in which said portion of said cage is the side walls of the cage, which are in the form of a cylinder of porous filter material.

3. A toilet tank fill valve as recited in claim 2, in which said opening from said cage to said tank is via a passageway which opens to the tank beneath the low water level of the tank corresponding to the lower stop position.

4. A toilet tank fill valve as recited in claim 1, in which said opening from said cage to said tank is via a passageway which opens to the tank beneath the low water level of the tank corresponding to the lower stop position.

5. The improvement as recited in claim 1, in which said valve is positioned below the tank-full water line, and in which said valve assembly includes a check valve located between said inlet and said valve to permit inlet flow of water through the valve into the tank but prevent emptying of the tank through the valve when inlet line pressure is removed.

6. The improvement as recited in claim 1, in which said float/weight means comprises a float/weight at least a portion of which rides up and down said rod between said upper and lower stops on said rod.

7. The improvement as recited in claim 6, in which said valve is positioned above the tank-full water line in said tank.

8. The improvement as recited in claim 6, in which said valve is positioned below the tank-full water line, and in which said valve assembly includes a check valve located between said inlet line and said valve to permit inlet flow of water through the valve into the tank but prevent emptying of the tank through the valve when inlet line pressure is removed.

* * * * *